(12) United States Patent
Miller

(10) Patent No.: US 10,165,884 B1
(45) Date of Patent: *Jan. 1, 2019

(54) SERVING CONTAINER AND RING ELEMENT SYSTEM

(71) Applicant: Sabine S. Miller, Virginia Beach, VA (US)

(72) Inventor: Sabine S. Miller, Virginia Beach, VA (US)

(*) Notice: Subject to any disclaimer, the term of this patent is extended or adjusted under 35 U.S.C. 154(b) by 59 days.

This patent is subject to a terminal disclaimer.

(21) Appl. No.: 15/368,775

(22) Filed: Dec. 5, 2016

Related U.S. Application Data

(63) Continuation of application No. 14/514,781, filed on Oct. 15, 2014, now Pat. No. 9,510,699, which is a
(Continued)

(51) Int. Cl.
| | |
|---|---|
| *A47J 37/01* | (2006.01) |
| *A21B 3/13* | (2006.01) |
| *B65D 1/34* | (2006.01) |
| *A47G 23/06* | (2006.01) |
| *B65D 43/02* | (2006.01) |

(Continued)

(52) U.S. Cl.
CPC .......... *A47G 23/06* (2013.01); *A47G 23/0683* (2013.01); *B65D 25/14* (2013.01); *B65D 25/2888* (2013.01); *B65D 43/0214* (2013.01); *B65D 53/02* (2013.01); *A47G 2023/0691* (2013.01); *A47J 36/34* (2013.01); *A47J 37/04* (2013.01); *A47J 45/10* (2013.01)

(58) Field of Classification Search
CPC ........... A21B 3/13; A21B 3/131; A21B 3/135; A21B 3/136; A47G 19/08; A47G 23/06; A47G 23/0683; A47G 23/08; A47J 27/002; A47J 27/14; A47J 27/16; A47J 27/17; A47J 36/2405; A47J 36/34; A47J 36/36; A47J 36/027; A47J 37/01; A47J 37/04; A47J 37/12; A47J 43/00; A47J 45/07; A47J 45/10; A47J 45/085; A47J 47/19; B65D 1/24; B65D 1/34; B65D 5/54; B65D 25/2867; B65D 25/14; B65D 25/2888; B65D 43/0214; B65D 53/02; B65D 81/34; B65D 81/38; B65D 81/3813; B65D 90/00
USPC ......... 206/565, 562, 499; 219/732; 426/113, 426/115, 119, 124, 128; 229/232, 903, 229/906; 16/435; 220/573.1, 574.3, 220/574.1, 9.1, 9.4, 912, 400, 780, 647, 220/648, 649
See application file for complete search history.

(56) References Cited

U.S. PATENT DOCUMENTS

| | | | |
|---|---|---|---|
| 3,169,659 A * | 2/1965 | Blackmore .......... | B65D 21/062 206/506 |
| D254,170 S * | 2/1980 | Croyle .................. | 294/31.2 |

(Continued)

*Primary Examiner* — J. Gregory Pickett
*Assistant Examiner* — Gideon Weinerth
(74) *Attorney, Agent, or Firm* — Shaddock Law Group, PC

(57) ABSTRACT

A serving container and ring element system that includes a serving dish and a ring element having a ring element lip with a shape that substantially corresponds to a shape of a serving dish lip, wherein portions of the ring element lip are formed to be positionable around at least a portion of the serving dish lip to provide frictional engagement between portions of said ring element lip and at least a portion of said serving dish lip, such that said ring element is capable of securing a foil pan within said serving dish.

20 Claims, 13 Drawing Sheets

Related U.S. Application Data continuation-in-part of application No. 13/875,389, filed on May 2, 2013, now Pat. No. 8,887,943.

(51) Int. Cl.
| | |
|---|---|
| *B65D 53/02* | (2006.01) |
| *B65D 25/28* | (2006.01) |
| *B65D 25/14* | (2006.01) |
| *A47J 36/34* | (2006.01) |
| *A47J 37/04* | (2006.01) |
| *A47J 45/10* | (2006.01) |

(56) References Cited

U.S. PATENT DOCUMENTS

| | | | | |
|---|---|---|---|---|
| 4,694,961 | A * | 9/1987 | Menendez | A21B 3/132 |
| | | | | 206/508 |
| 4,717,038 | A * | 1/1988 | Anders | A47J 36/022 |
| | | | | 220/640 |
| 5,203,254 | A * | 4/1993 | Fletcher | A47J 37/0694 |
| | | | | 211/181.1 |
| 5,266,763 | A * | 11/1993 | Colombo | B65D 25/18 |
| | | | | 219/734 |
| 5,339,728 | A * | 8/1994 | Marchwiak | A47J 36/22 |
| | | | | 211/181.1 |
| 5,511,467 | A * | 4/1996 | Motley | A47J 27/06 |
| | | | | 211/85.4 |
| 6,065,629 | A * | 5/2000 | Sarnoff | B65D 1/34 |
| | | | | 220/315 |
| 6,313,446 | B1 * | 11/2001 | Jones | A47J 36/022 |
| | | | | 219/433 |
| 6,705,210 | B2 * | 3/2004 | Leonard | A47J 36/24 |
| | | | | 126/384.1 |
| D635,820 | S * | 4/2011 | Molayem | D7/354 |
| 8,678,223 | B2 * | 3/2014 | Sarnoff | A47J 45/062 |
| | | | | 206/449 |
| 8,887,943 | B1 * | 11/2014 | Miller | A47J 39/006 |
| | | | | 206/557 |
| 9,010,566 | B2 * | 4/2015 | Miller | A47J 45/10 |
| | | | | 184/44 |
| 9,510,699 | B1 * | 12/2016 | Miller | A47G 19/12 |
| 2005/0098046 | A1 * | 5/2005 | Morgan | A21B 3/13 |
| | | | | 99/426 |
| 2005/0247212 | A1 * | 11/2005 | Meeks | A21B 3/136 |
| | | | | 99/426 |
| 2006/0027106 | A1 * | 2/2006 | Craig | A47J 37/01 |
| | | | | 99/448 |
| 2006/0169151 | A1 * | 8/2006 | Griffin | A21B 3/135 |
| | | | | 99/426 |
| 2006/0225725 | A1 * | 10/2006 | Rinaldo | A47J 37/0763 |
| | | | | 126/9 R |
| 2006/0266757 | A1 * | 11/2006 | Camacho | A21B 3/136 |
| | | | | 220/574 |
| 2008/0248173 | A1 * | 10/2008 | Hopkins, Sr. | A47J 36/027 |
| | | | | 426/243 |
| 2009/0061128 | A1 * | 3/2009 | Liu | A21B 3/136 |
| | | | | 428/34.4 |
| 2009/0302042 | A1 * | 12/2009 | Henry | A21B 3/135 |
| | | | | 220/573.4 |
| 2012/0043336 | A1 * | 2/2012 | Grider | A47J 36/06 |
| | | | | 220/573.1 |
| 2012/0103998 | A1 * | 5/2012 | Sarnoff | A47J 37/01 |
| | | | | 220/573.1 |
| 2013/0186903 | A1 * | 7/2013 | Leonard | A47J 27/002 |
| | | | | 220/574 |
| 2013/0240552 | A1 * | 9/2013 | Thomas | B65D 77/202 |
| | | | | 220/806 |
| 2013/0341335 | A1 * | 12/2013 | Sitabkhan | A47J 27/002 |
| | | | | 220/573.5 |
| 2014/0017371 | A1 * | 1/2014 | Gattineri | A47J 37/01 |
| | | | | 426/389 |
| 2015/0208860 | A1 * | 7/2015 | Parr | A47J 37/01 |
| | | | | 220/573.1 |
| 2015/0351410 | A1 * | 12/2015 | Galbincea | A47J 29/06 |
| | | | | 220/573.1 |

* cited by examiner

SERVING CONTAINER AND RING ELEMENT SYSTEM

CROSS-REFERENCE TO RELATED APPLICATIONS

This patent application is a Continuation of U.S. patent application Ser. No. 14/514,781, filed Oct. 15, 2014, now U.S. Pat. No. 9,510,699, which is a Continuation-in-Part of U.S. patent application Ser. No. 13/875,389, filed May 2, 2013, now U.S. Pat. No. 8,887,943, the disclosures of which are incorporated herein by reference in their entireties.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE INVENTION

1. Field of the Invention

The present disclosure relates generally to the field of baking/serving containers. More specifically, the present invention relates to serving container system that can provide decorative ornamentation, improved insulation, and/or rigidity to a foil pan.

2. Description of Related Art

Foil pans can be very convenient for cooking and preparing various types of food. However, while functional, foil pans are typically not decorative in nature and can detract from a table setting if food is served from the foil pan. Additionally, foil pans are generally flimsy and difficult to carry once food has been prepared in the foil pan.

In some instances, people choose to use ornamental baking or serving dishes instead of foil pans. While ornamental baking or serving dishes do provide for a better presentation, cleanup is typically more difficult.

Additionally, some choose to use foil pans if there is a possibility that leftover food will remain after a meal or gathering, because it is more convenient to leave a foil pan at the meal or gathering than a typical baking or serving dish.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE INVENTION

The present invention provides a serving container system that allows for the use of a convenient foil pan together with a decorative or ornamental baking/serving dish.

In various exemplary, non-limiting embodiments, the serving container system comprises a bottom element, a middle element, and an optional top element. In certain exemplary embodiments, the bottom element, or serving dish, serves various functions—supporting the bottom of an inserted foil pan, maintaining the temperature of the contents of an inserted foil pan, and transporting food dishes with ease and without the use of hot pads. It should be understood that the bottom element can be sized to accommodate any existing foil baking pan and has sides that extend out, creating handles for easy carrying.

The middle element, or ring element, serves as a decorative edge that will easily snap on the bottom element and secure the foil baking pan in place. In certain embodiments, the middle element bevels over the interior edge of the pan and snaps on the underside of the bottom element handle. The middle element also serves as support for the top element.

The top element, or cover, serves both as a snap on cover for transporting food and as a serving dish when separated and inverted. The cover will be similar in shape and size to the bottom element, although slightly smaller, to allow the top element to fit not only on the middle element when used as a cover, but also to fit inside the middle and bottom element when inverted for storage purposes.

In various exemplary, non-limiting embodiments, the serving container system comprises a serving dish, a foil pan, a ring element, and a cover element.

The serving dish generally includes a bottom wall, a pair of upwardly extending side walls, and a pair of upwardly extending end walls, wherein the upwardly extending side walls and the upwardly extending end walls extend upwardly from around an outer periphery of the bottom wall and are continuous at four corners, wherein a continuous serving dish lip extends outwardly from an upper edge of the upwardly extending side walls and the upwardly extending end walls, and wherein at least two serving dish handles extend outwardly from the continuous serving dish lip on opposing sides of the serving dish.

The foil pan generally includes a bottom wall, a pair of upwardly extending side walls, and a pair of upwardly extending end walls, wherein the upwardly extending side walls and the upwardly extending end walls extend upwardly from around an outer periphery of the bottom wall and are continuous at four corners, and wherein a continuous foil pan lip extends outwardly from an upper edge of the upwardly extending side walls and the upwardly extending end walls. The foil pan generally has a shape that substantially corresponds to the shape of the serving dish, such that the foil pan can be substantially nested within the serving dish.

The ring element generally includes a ring element lip having a shape that substantially corresponds to the shape of the serving dish lip, wherein at least two ring element handle portions extend outwardly from the ring element lip, wherein each ring element handle portion has a shape that substantially corresponds to the shape of the serving dish handles, wherein each ring element handle portion includes a handle skirt portion extending downwardly from the handle portion, wherein each handle skirt portion is formed so as to be positionable around at least a portion of a serving dish handle and provide frictional engagement of the handle skirt portion with at least a portion of the serving dish handle, and wherein when the handle skirt portions are in frictional engagement with at least a portion of each of the serving dish handles, the ring element secures the foil pan within the serving dish.

The cover element generally includes a top wall, a pair of downwardly extending side walls, and a pair of downwardly extending end walls, wherein the downwardly extending side walls and the downwardly extending end walls extend downwardly from around an outer periphery of the top wall and are continuous at four corners, wherein a continuous cover element lip extends outwardly from a lower edge of the downwardly extending side walls and the downwardly extending end walls, wherein at least two cover element handles extend outwardly from the continuous cover element lip on opposing sides of the cover element, and wherein the cover element includes one or more cover engagement tabs extending from portions of the cover element lip to provide frictional engagement of the cover element with at least a portion of the ring element lip.

When the serving container system is used, a foil pan can be nested within a serving dish. The ring element can then be used to secure the foil pan within the serving dish. The ring element and the serving dish can provide an ornamental or decorative cover to the foil pan. By using the ring element, the lip of the foil pan can be covered to give an improved aesthetic appearance.

The cover of the present invention can be removably secured, through interaction of the one or more cover engagement tabs and at least a portion of the ring element lip, to insulate and/or protect food contained within the foil pan.

In various exemplary, nonlimiting embodiments, the serving container system comprises a serving dish, wherein the serving dish includes a bottom wall, a continuous, upwardly extending side wall, wherein the upwardly extending side wall extends upwardly from around an outer periphery of the bottom wall, wherein a continuous serving dish lip extends outwardly from an upper edge of the upwardly extending side wall; and a ring element, wherein the ring element includes a ring element lip having a shape that substantially corresponds to the shape of the serving dish lip, wherein portions of the ring element lip are formed to be positionable around at least a portion of the serving dish lip to provide frictional engagement between portions of the ring element lip and at least a portion of the serving dish lip.

The ring element lip of the serving container system may optionally include one or more ring element lip extensions that extend downwardly from the ring element lip and wherein the cover engagement tabs extend from portions of the cover element lip to provide frictional engagement between the one or more cover engagement tabs and at least a portion of the ring element lip and the ring element lip extensions.

The serving container system may optionally include a cover element, wherein the cover element includes a top wall, a continuous, downwardly extending side wall, wherein the downwardly extending side wall extends downwardly from around an outer periphery of the top wall, wherein a continuous cover element lip extends outwardly from a lower edge of the downwardly extending side wall, wherein one or more cover engagement tabs extend from portions of the cover element lip to provide frictional engagement between the one or more cover engagement tabs and at least a portion of the ring element lip.

In certain exemplary embodiments, the serving dish may optionally include at least two serving dish handles extend outwardly from the continuous serving dish lip on opposing sides of the serving dish. In these exemplary embodiments, the cover element may optionally include at least two cover element handles extend outwardly from the continuous cover element lip on opposing sides of the cover element. Additionally, at least two ring element handle portions may optionally extend outwardly from the ring element lip, wherein each ring element handle portion has a shape that substantially corresponds to the shape of the serving dish handles, wherein each ring element handle portion includes a handle skirt portion extending downwardly from the handle portion, wherein each handle skirt portion is formed so as to be positionable around at least a portion of a serving dish handle and provide frictional engagement of the handle skirt portion with at least a portion of the serving dish handle, and wherein when the handle skirt portions are in frictional engagement with at least a portion of each of the serving dish handles.

In certain exemplary embodiments, the serving container system also includes a foil pan having a shape that substantially corresponds to the shape of the serving dish, such that the foil pan can be substantially nested within the serving dish, and wherein the ring element is capable of securing the foil pan within the serving dish.

Accordingly, the presently disclosed invention provides a serving container system that allows a user to secure a foil pan within a serving dish.

The presently disclosed invention separately provides a serving container system that provides a decorative ring element or overlay for the otherwise visible lip of a foil pan.

The presently disclosed invention separately provides a serving container system that can be made to accommodate various size foil pans.

The presently disclosed invention separately provides a serving container system that provides a rigid, protective cover for a foil pan.

These and other aspects, features, and advantages of the present invention are described in or are apparent from the following detailed description of the exemplary, non-limiting embodiments of the present invention and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

Any benefits, advantages, or solutions to problems that are described herein with regard to specific embodiments are not intended to be construed as a critical, required, or essential feature(s) or element(s) of the present invention or the claims.

BRIEF DESCRIPTION OF THE SEVERAL VIEWS OF THE DRAWINGS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present invention.

The exemplary embodiments of this invention will be described in detail, with reference to the following figures, wherein like reference numerals refer to like parts throughout the several views, and wherein.

DETAILED DESCRIPTION OF THE INVENTION

Figure 1:
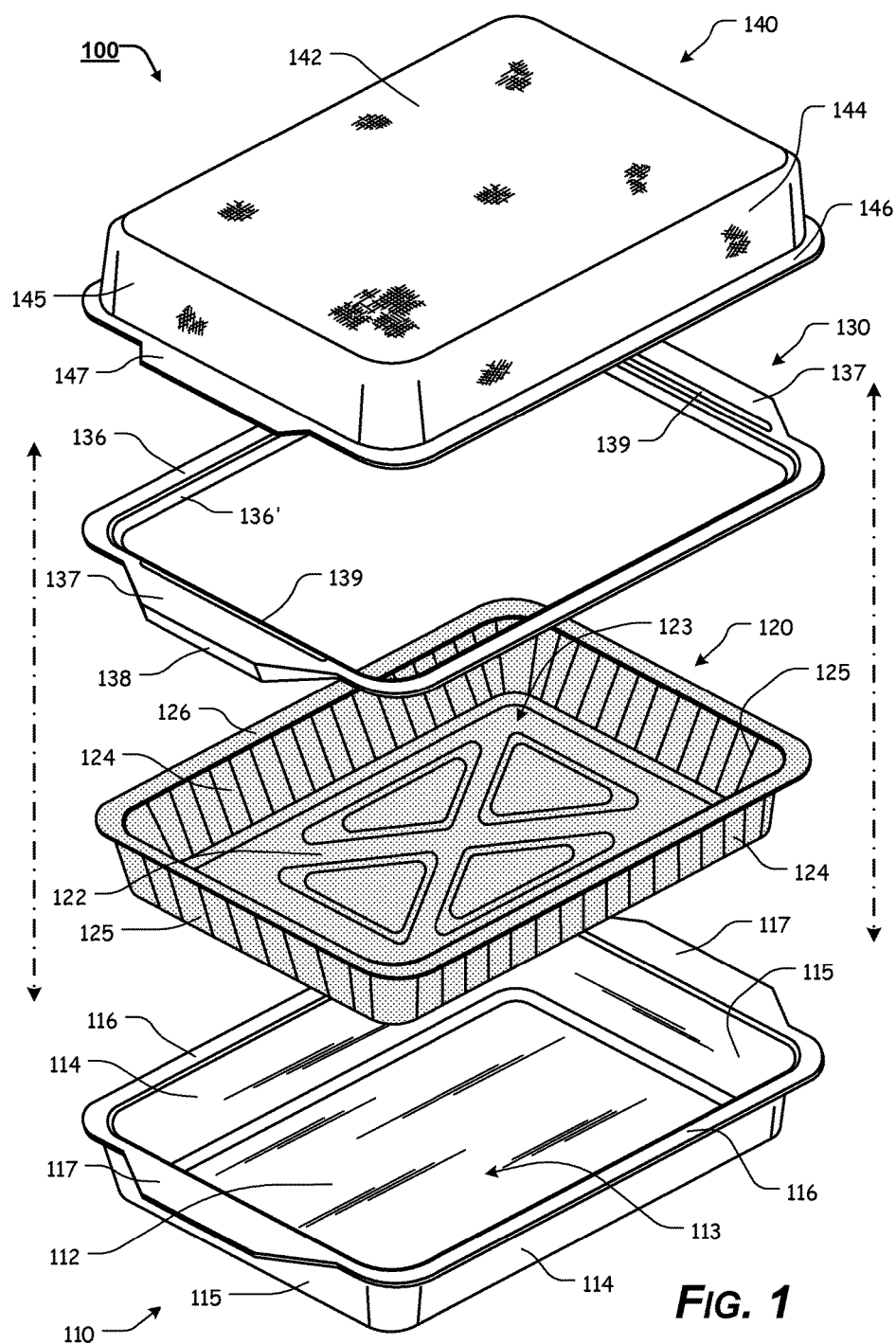
FIG. 1 illustrates a perspective view of the various elements of a first exemplary embodiment of a serving container system, according to this invention.
Figure 2:
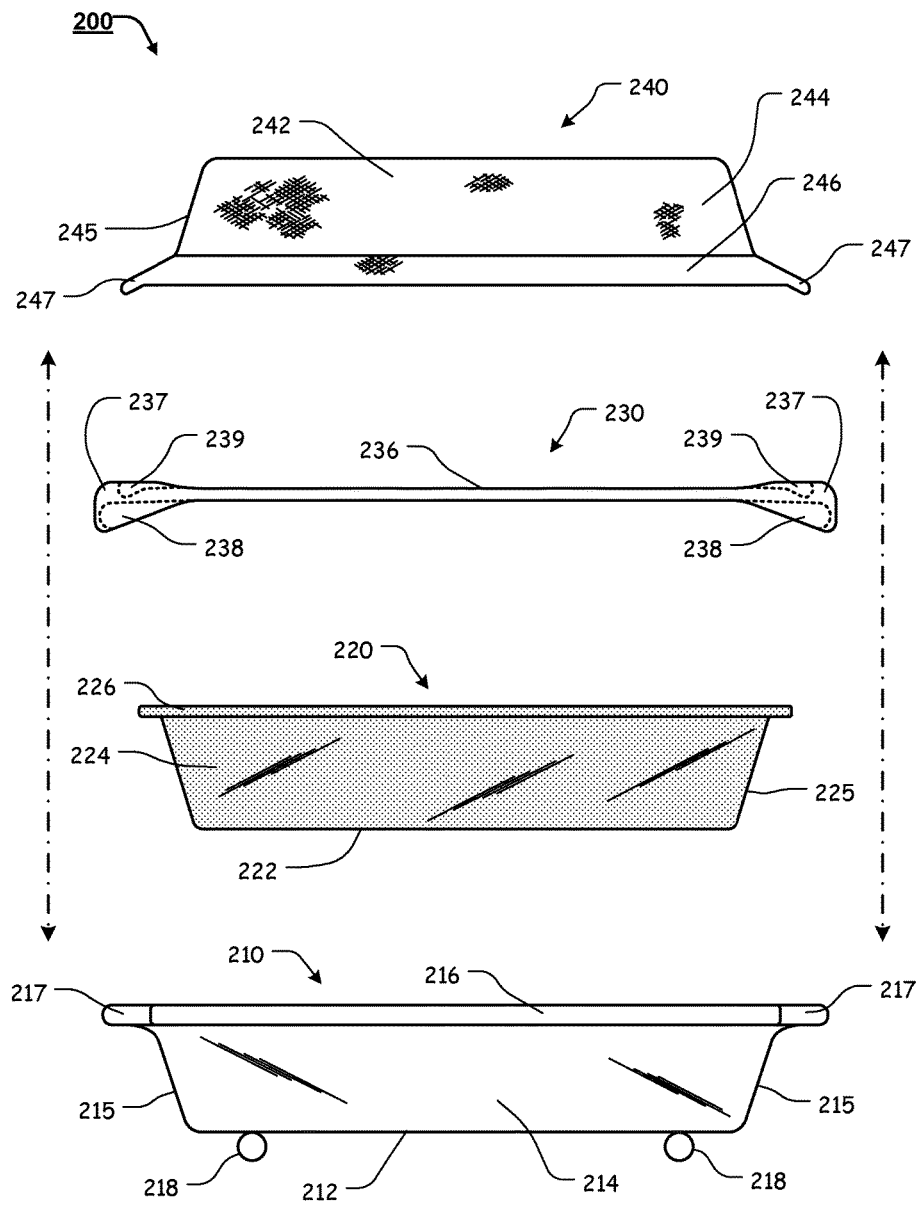
FIG. 2 illustrates a side view of the various elements of a second exemplary embodiment of a serving container system, according to this invention.
Figure 3:
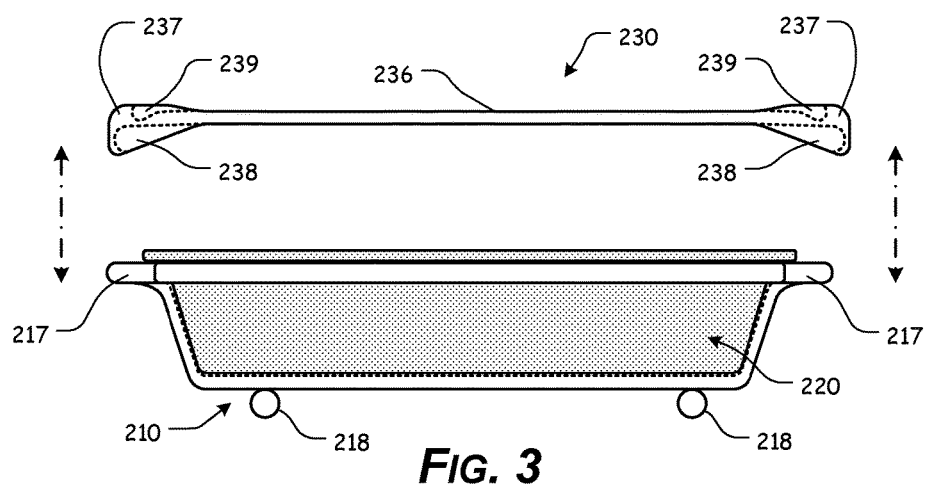
FIG. 3 illustrates a side view of certain of the elements of a second exemplary embodiment of a serving container system, according to this invention.
Figure 4:
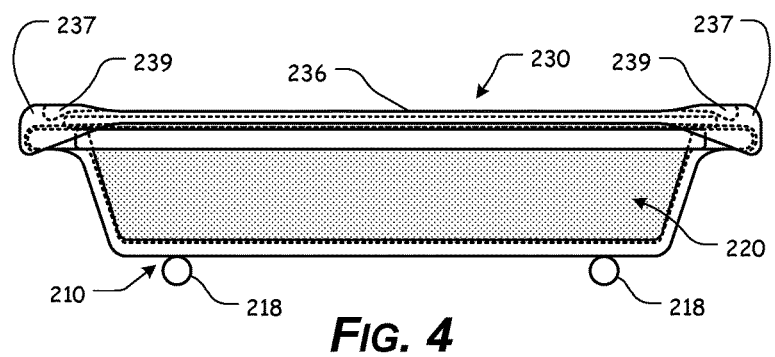
FIG. 4 illustrates a side view of certain of the elements of a second exemplary embodiment of a serving container system, wherein the ring element is illustrated as securing a foil pan within a serving dish, according to this invention.
Figure 5:
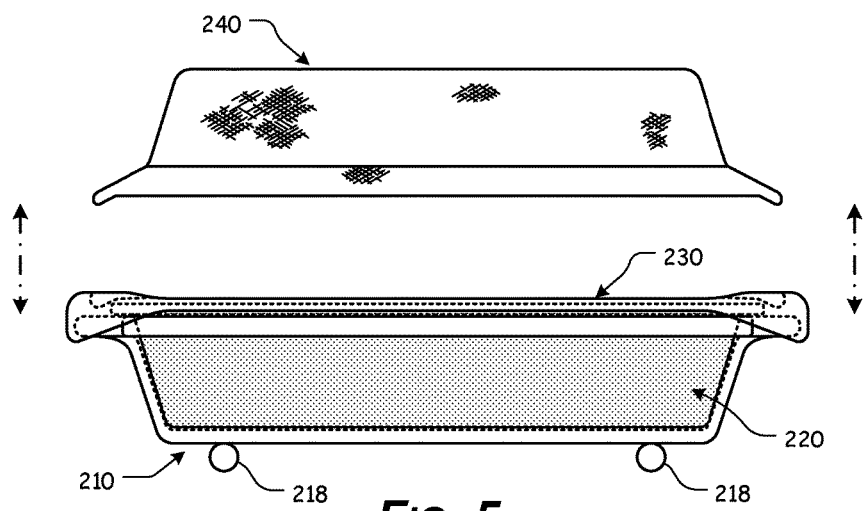
FIG. 5 illustrates a side view of certain of the elements of a second exemplary embodiment of a serving container system, according to this invention.
Figure 6:
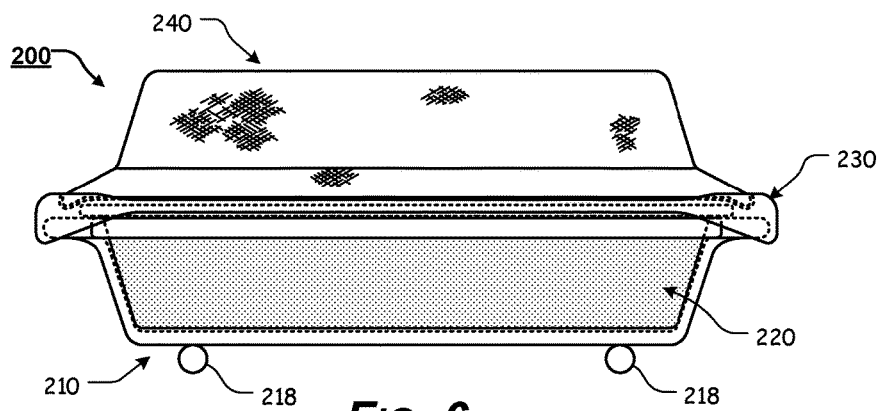
FIG. 6 illustrates a side view of certain of the elements of a second exemplary embodiment of a serving container system, wherein the cover is illustrated as being secured to the ring element, according to this invention.
Figure 7:
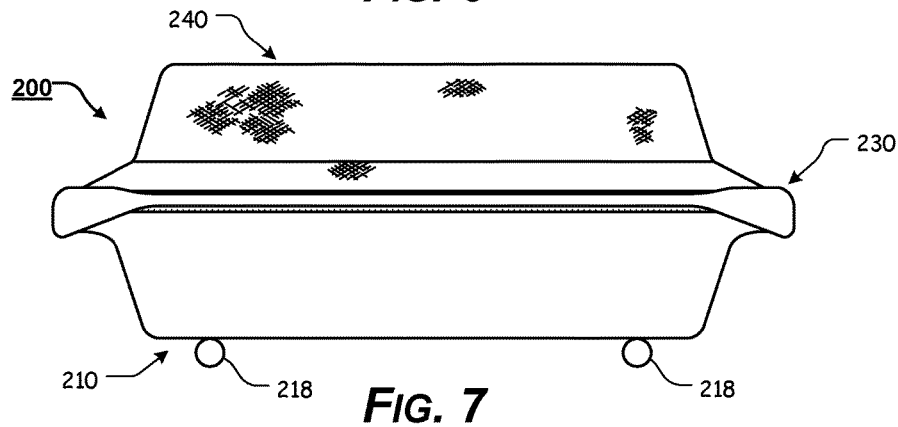
FIG. 7 illustrates a second side view of certain of the elements of a second exemplary embodiment of a serving container system, wherein the cover is illustrated as being secured to the ring element, according to this invention.

For simplicity and clarification, the design factors and operating principles of the serving container system according to this invention are explained with reference to various exemplary embodiments of a serving container system according to this invention. The basic explanation of the design factors and operating principles of the serving container system is applicable for the understanding, design, and operation of the serving container system of this invention. It should be appreciated that the serving container system can be adapted to be used with any serving container or serving dish.

As used herein, the word "may" is meant to convey a permissive sense (i.e., meaning "having the potential to"), rather than a mandatory sense (i.e., meaning "must"). Unless stated otherwise, terms such as "first" and "second" are used to arbitrarily distinguish between the elements such terms describe. Thus, these terms are not necessarily intended to indicate temporal or other prioritization of such elements.

The term "coupled", as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes", or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

It should also be appreciated that the terms "serving container", "serving dish", "foil pan", "ring", and "cover" are used for basic explanation and understanding of the operation of the systems, methods, and apparatuses of this invention. Therefore, the terms "serving container", "serving dish", "foil pan", "ring", and "cover" are not to be construed as limiting the systems, methods, and apparatuses of this invention. Thus, the terms "serving container" and "serving dish" are to be understood to broadly include any food preparation or serving container, pan, or dish.

For simplicity and clarification, the serving container system of this invention will be described as being substantially rectangular and being used in conjunction with a rectangular foil pan. However, it should be appreciated that these are merely exemplary embodiments of the serving container system and are not to be construed as limiting this invention. Thus, the serving container system of this invention may be utilized with any size or shape foil pan, such as, for example, rectangular, square, round, oval, and the like. Additionally, the foil pan may be replaced by another substantially rigid pan or dish.

Throughout this application the word "comprise", or variations such as "comprises" or "comprising" are used. It will be understood that these terms are meant to imply the inclusion of a stated element, integer, step, or group of elements, integers, or steps, but not the exclusion of any other element, integer, step, or group of elements, integers, or steps.

Turning now to the drawing Figs., FIG. 1 illustrates certain elements and/or aspects of a first exemplary embodiment of the serving container system 100, according to this invention. In illustrative, non-limiting embodiment(s) of this invention, as illustrated in FIG. 1, the serving container system 100 comprise at least some of a serving dish 110, a foil pan 120, a hollow or substantially hollow ring element 130, and a cover 140.

The serving dish 110 includes a bottom wall 112. A pair of opposing, upwardly extending side walls 114 and a pair of opposing, upwardly extending end walls 115 extend from around an outer periphery of the bottom wall 112. The extending side walls 114 and the extending end walls 115 meet and are continuous at four corners. A continuous serving dish lip 116 extends outwardly from an upper edge of the upwardly extending side walls 114 and the upwardly extending end walls 115.

In various exemplary embodiments, a plurality of feet 118 (not shown) extend from the bottom side of the bottom wall 112. The feet 118 (not shown) may comprise spheres, semi-spheres, or other projections that extend from the bottom wall 112. The feet 118 (not shown), if included, are positioned so as to contact a surface that the serving dish 110 is placed upon and help to create an air gap between the bottom wall 112 and the surface. In this manner, if the serving dish 110 is hot, the transmission of heat from the serving dish 110 to the surface that the serving dishes placed upon is reduced or minimized.

A cavity 113 is defined within the area formed by the bottom wall 112, the extending side walls 114, and the extending end walls 115. The cavity 113 may also include the area within the serving dish lip 116 and be defined within the area formed by the bottom wall 112, the extending side walls 114, the extending end walls 115, and the serving dish lip 116.

Typically, two serving dish handles 117 extend outwardly from the continuous serving dish lip 116 on opposing sides of the serving dish 110. The size, shape, and placement of the serving dish handles 117 is a design choice based upon the desired appearance and/or functionality of the serving dish 110.

The foil pan 120 includes a bottom wall 122. A pair of opposing, upwardly extending side walls 124 and a pair of opposing, upwardly extending end walls 125 extend from around an outer periphery of the bottom wall 122. The extending side walls 124 and the extending end walls 125 meet and are continuous at four corners. A continuous foil pan lip 126 extends outwardly from an upper edge of the upwardly extending side walls 124 and the upwardly extending end walls 125.

A cavity 123 is defined within the area formed by the bottom wall 122, the extending side walls 124, and the extending end walls 125. The cavity 123 may also include the area within the foil pan lip 126 and be defined within the area formed by the bottom wall 122, the extending side walls 124, the extending end walls 125, and the foil pan lip 126.

While the foil pan 120 is illustrated as being included in the serving container system 100, it should be understood that the foil pan 120 is an exemplary foil pan that can be utilized with the serving container system 100 and is not a necessary component of the serving container system 100. Therefore, the foil pan 120 may or may not be included as an element of the serving container system 100. Notwithstanding the foregoing, the foil pan 120 has a size and shape that substantially corresponds to the size and shape of the serving dish 110. In this manner, the foil pan 120 can be substantially nested within the serving dish 110.

If nested within the cavity 113 of the serving dish 110, the foil pan lip 126 typically rests atop the serving dish lip 116. However, it should be appreciated that, in various exemplary embodiments, the foil pan lip 126 may fit within the cavity 113 of the serving dish 110, when the foil pan 120 is nested within the serving dish 110.

The ring element 130 includes a continuous or substantially continuous ring element lip 136 having a shape that substantially corresponds to the shape of the serving dish lip 116. At least two ring element handle portions 137 extend outwardly from the ring element lip 136. It should be appreciated that the number of ring element handle portions 137 is dictated by the number of usable serving dish handle portions 117. Each ring element handle portion 137 has a shape that substantially corresponds to the shape of the serving dish handles 117 and includes a handle skirt portion 138 that extends downwardly from the handle portion 137.

Each handle skirt portion 138 is formed to be positionable around at least a portion of a serving dish handle 117 and provide frictional engagement of the handle skirt portion 138 with at least a portion of the serving dish handle 117. In various exemplary embodiments, the handle skirt portions 138 extend outwardly from the handle portions 137, below a longitudinal plane formed by a bottom portion of the ring element lip 136.

The ring element 130 further includes at least one recess 139 formed in each ring element handle portion 137 or each ring element lip 136. In certain exemplary embodiments, each recess 139 comprises a recess or cavity formed in the element handle portion 137 or the ring element lip 136 of the ring element 130. Alternatively, each recess 139 may be formed of an aperture that extends through each ring element handle portion 137 or each ring element lip 136.

It should be appreciated that the size, shape, and placement of each recess 139 is a design choice based upon the size, shape, and placement of the cover element handles 147 (as described below).

In certain exemplary embodiments, the ring element lip 136 further includes a ring element lip extension 136' that extends downwardly from the ring element lip 136, below the longitudinal plane formed by the bottom portion of the ring element lip 136. In this manner, when the ring element 130 is placed atop the serving dish 110, the ring element lip extension 136' may extend into the cavity 113 of the serving dish 110 or may extend outside of the serving dish lip 116.

The cover element 140 includes a top wall 142. A pair of opposing, downwardly extending side walls 144 and a pair of opposing, downwardly extending end walls 145 extend from around an outer periphery of the top wall 142. The extending side walls 144 and the extending end walls 145 meet and are continuous at four corners. A continuous cover element lip 146 extends outwardly from a lower edge of the downwardly extending side walls 144 and the downwardly extending end walls 145.

A cavity is defined within the area formed by the top wall 142, the extending side walls 144, and the extending end walls 145. The cavity 143 may also include the area within the cover element lip 146 and be defined within the area formed by the top wall 142, the extending side walls 144, the extending end walls 145, and the cover element lip 146.

At least two cover element handles 147 extend outwardly from the continuous cover element lip 146 on opposing sides of the cover element 140. Each cover element handle 147 is formed to be at least partially received within a recess 139 of the ring element 130.

In various exemplary embodiments, various components of the serving container system 100 (i.e., the serving dish 310 and the cover 340) may be substantially rigid and formed of a ceramic or other similar material. Certain other components, (i.e., the ring 330) may be at least somewhat flexible and formed of a rubber, silicone, or other similar material.

Alternate materials of construction of the various components of the serving container system 100 may include one or more of the following: wood, steel, stainless steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the serving container system 100 is a design choice based on the desired appearance and functionality of the serving container system 100.

It should be appreciated that certain elements of the serving container system 100 may be formed as an integral unit (such as, for example, the bottom wall 112, the extending side walls 114, the extending end walls 115, the serving dish lip 116, and the handles 117). Alternatively, suitable materials can be used and sections or elements made independently and attached or coupled together, such as by adhesives, welding, screws, rivets, pins, or other fasteners, to form the various elements of the serving container system 100.

It should also be understood that the overall size and shape of the elements of the serving container system 100, and the various portions thereof, is a design choice based upon the desired functionality and/or appearance of the serving container system 100.

When in use, a foil pan, such as, for example, exemplary foil pan 120 is nested within the cavity 113 of the serving dish 110. The ring element 130 is then aligned so that each ring element handle portion 137 is aligned atop a corresponding serving dish handle 117. As force is applied to the ring element handle portions 137, the handle skirt portions 138 are urged and frictionally fitted around at least a portion of the serving dish handles 117. When the handle skirt portions 138 are in frictional engagement with at least a portion of each of the serving dish handles 117, the ring element 130 is removably secured to the serving dish 110 and the ring element 130 secures the foil pan 120 within the serving dish 110.

If desired, the cover 140 can be releasably attached atop the ring element 130. To releasably attach the cover 140 to the ring element 130, the cover element handles 147 are urged into and at least partially received within the corresponding recesses 139 of the ring element 130.

FIGS. 2-9 illustrate certain elements and/or aspects of a second exemplary embodiment of a serving container system 200, according to this invention. As illustrated in FIGS. 2-9, the serving container system 200 comprises at least some of a serving dish 210 having a bottom wall 212, a cavity 213, upwardly extending side walls 214, upwardly extending end walls 215, a serving dish lip 216, serving dish handles 217, and a plurality of feet 218, an exemplary foil pan 220 having a bottom wall 222, a cavity 223, upwardly extending side walls 224, upwardly extending end walls 225, and a foil pan lip 226, a ring element 230 having a ring element lip 236, a ring element lip extension 236' (not numbered), ring element handle portions 237, handle skirt portions 238, and at least one recess 239, a cover 240 having a top wall 242, downwardly extending side walls 244, downwardly extending end walls 245, a continuous cover element lip 246, and cover element handles 247.

It should be understood that each of these elements corresponds to and operates similarly to the serving dish 110, the bottom wall 112, the cavity 113, the upwardly extending side walls 114, the upwardly extending end walls 115, the serving dish lip 116, the serving dish handles 117, the feet 118 (not shown), the exemplary foil pan 120, the bottom wall 122, the cavity 123, the upwardly extending side walls 124, the upwardly extending end walls 125, the foil pan lip 126, the ring element 130, the ring element lip 136, the ring element lip extension 136', the ring element handle portions 137, the handle skirt portions 138, and the at least one recess 139, the cover 140, the top wall 142, the downwardly extending side walls 144, the downwardly extending end walls 145, the continuous cover element lip 146, and the cover element handles 147, as described above with reference to the serving container system 100 of FIG. 1.

However, as illustrated in FIGS. 2-9, the overall shape of the cover 240 and the size and shape of the handles 247 are altered. Likewise, the recesses 239 are altered to accommodate the handles 247.

Figure 8:
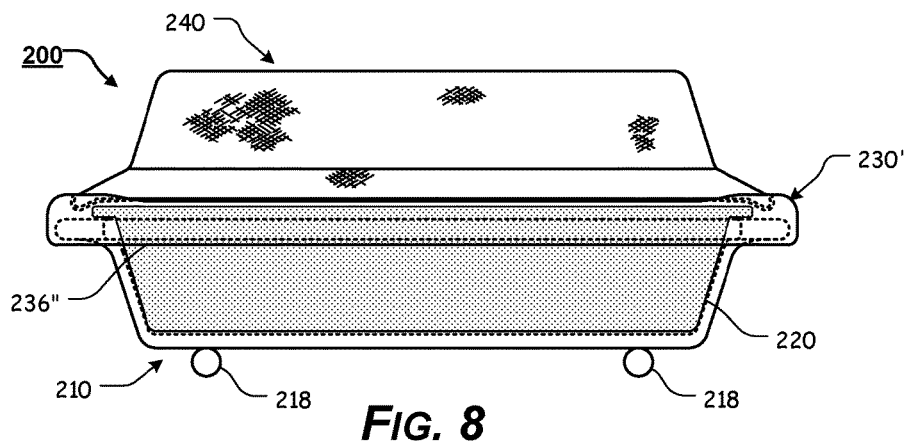
FIG. 8 illustrates a side view of certain of the elements of a second exemplary embodiment of a serving container system, wherein the cover is illustrated as being secured to a modified version of the ring element, according to this invention.
Figure 9:
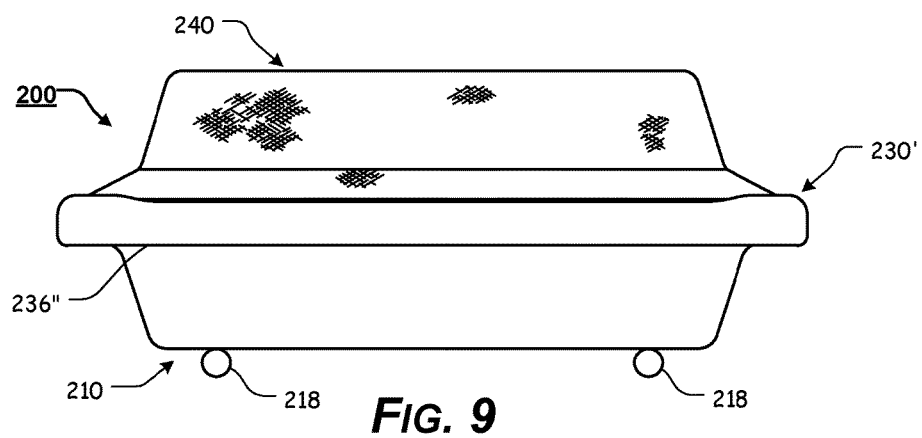
FIG. 9 illustrates a second side view of certain of the elements of a second exemplary embodiment of a serving container system, wherein the cover is illustrated as being secured to a modified version of the ring element, according to this invention.

FIGS. 8-9 illustrate certain elements and/or aspects of a second exemplary embodiment of a serving container system 200, wherein the cover 240 is illustrated as being secured to a modified version of the ring element 230'. The modified ring element 230' includes a ring element lip extension 236" that extends downwardly from the ring element lip 236, below the longitudinal plane formed by the bottom portion of the ring element lip 236. In this manner, when the ring element 230 is placed atop the serving dish 210, the ring element lip extension 236" extends outside the serving dish lip 216.

Figure 10:
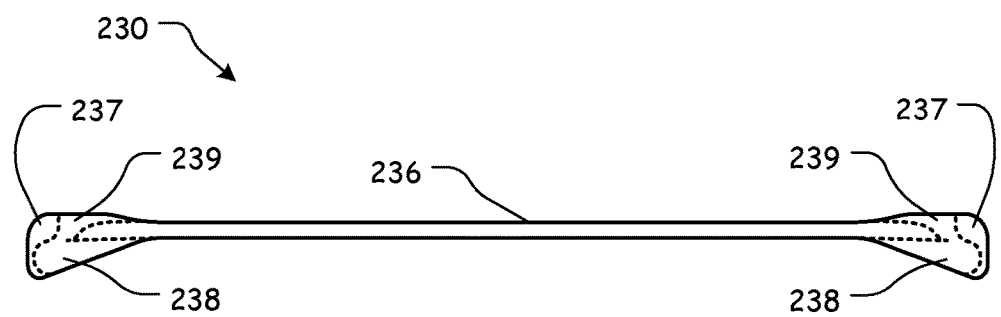
FIG. 10 illustrates a side view of an exemplary embodiment of an alternative embodiment of the ring element, according to this invention.
Figure 11:
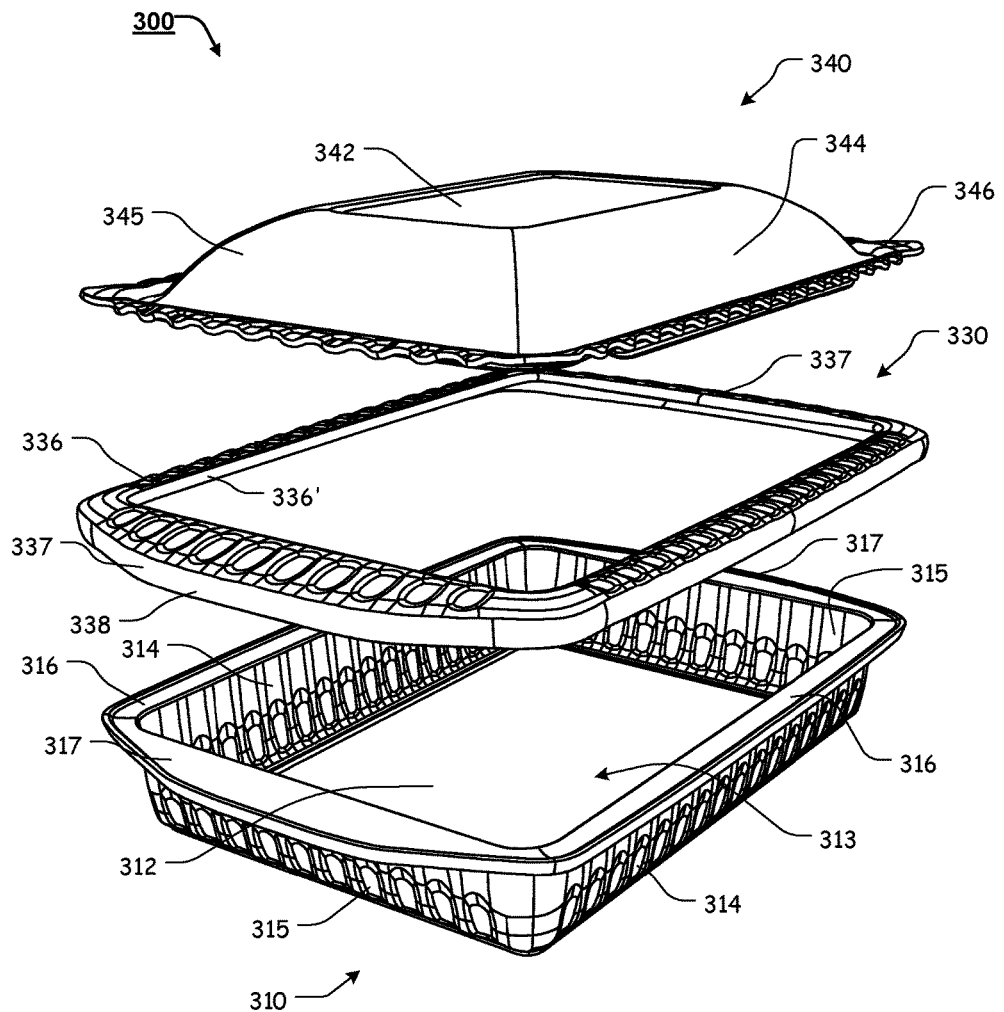
FIG. 11 illustrates a perspective view of the various elements of a third exemplary embodiment of a serving container system, according to this invention.
Figure 12:
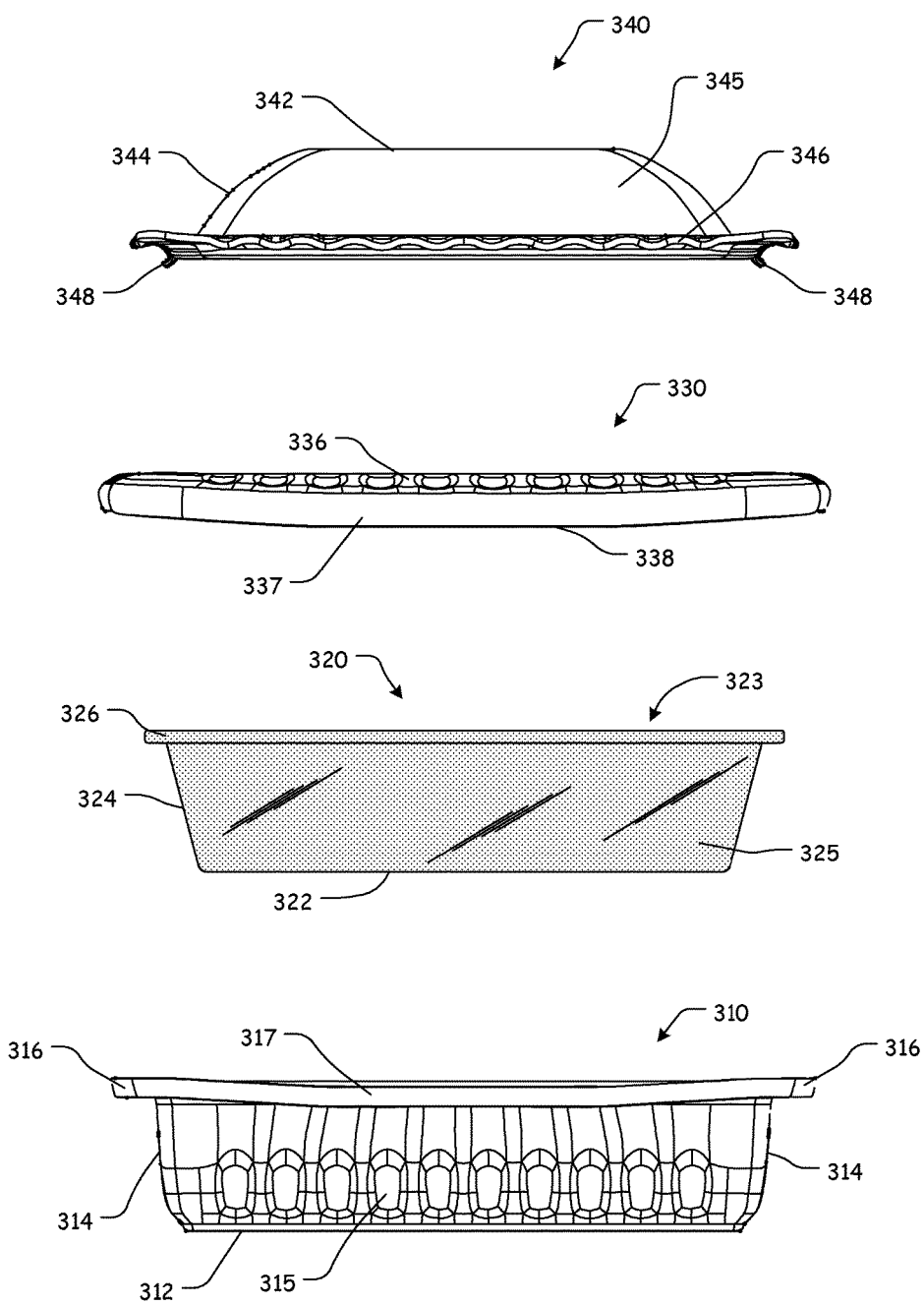
FIG. 12 illustrates a front view of the various elements of the third exemplary embodiment of a serving container system, according to this invention.
Figure 13:
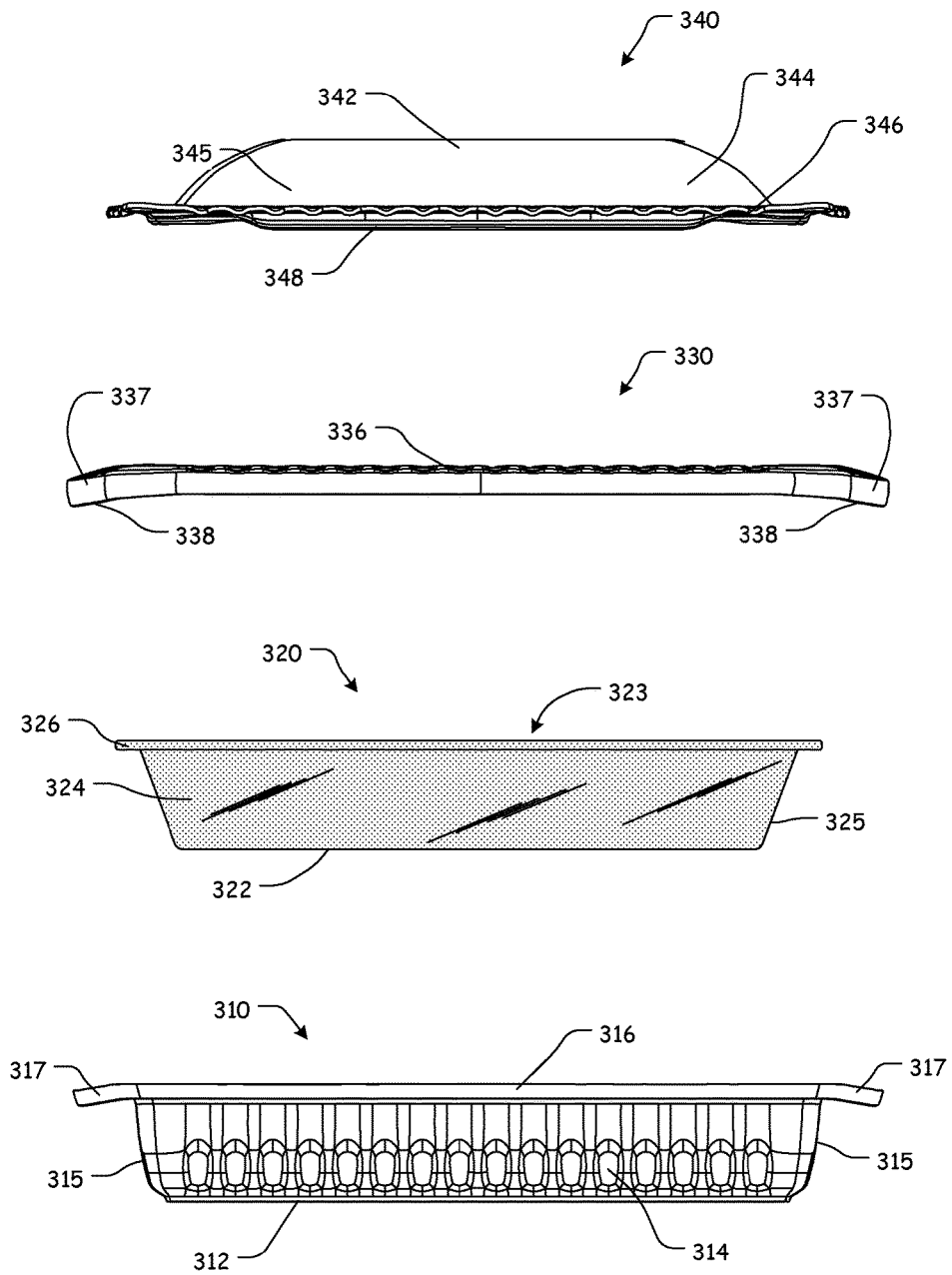
FIG. 13 illustrates a side view of the various elements of the third exemplary embodiment of a serving container system, according to this invention.
Figure 14:
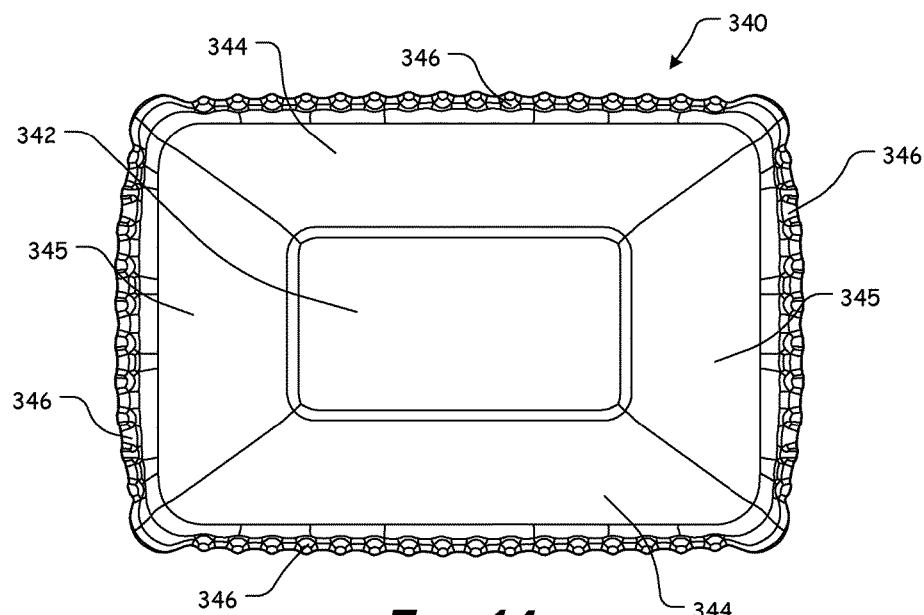
FIG. 14 illustrates a top view of the cover element of the third exemplary embodiment of a serving container system, according to this invention.
Figure 15:
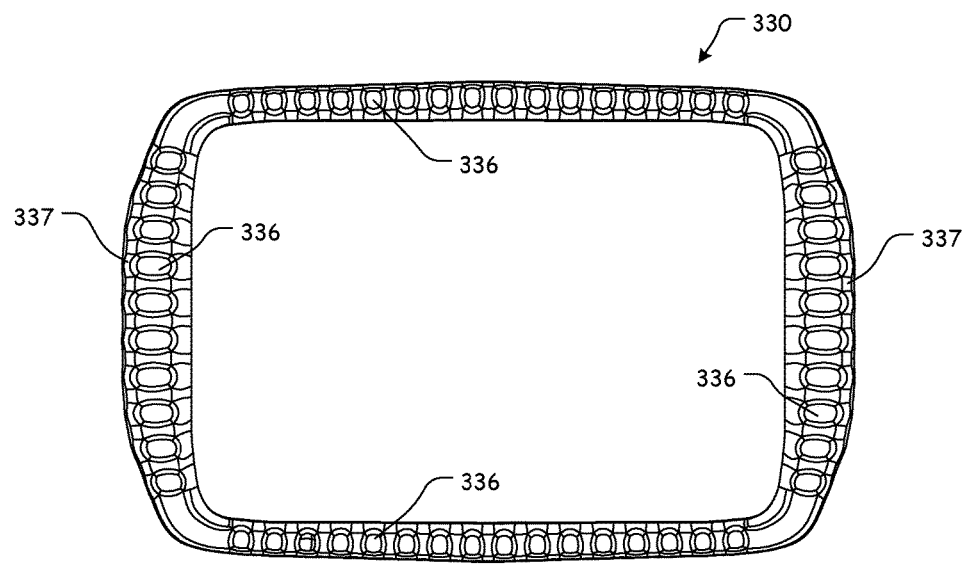
FIG. 15 illustrates a top view of the ring element of the third exemplary embodiment of a serving container system, according to this invention.
Figure 16:
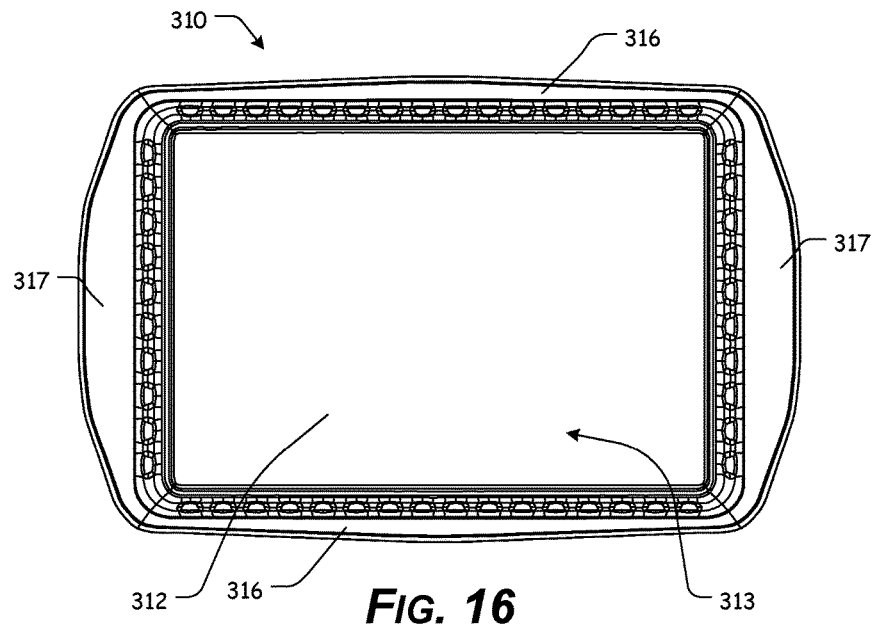
FIG. 16 illustrates a top view of the bottom element of the third exemplary embodiment of a serving container system, according to this invention.
Figure 17:
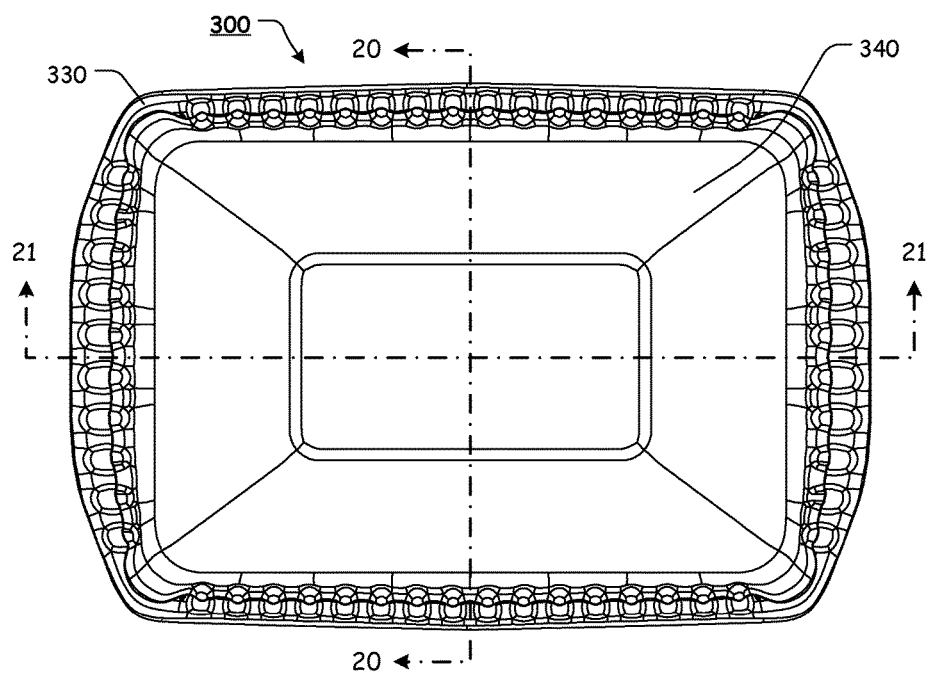
FIG. 17 illustrates a top view of the assembled combination of the cover element, the ring element, and the bottom element of the third exemplary embodiment of a serving container system, according to this invention.
Figure 18:
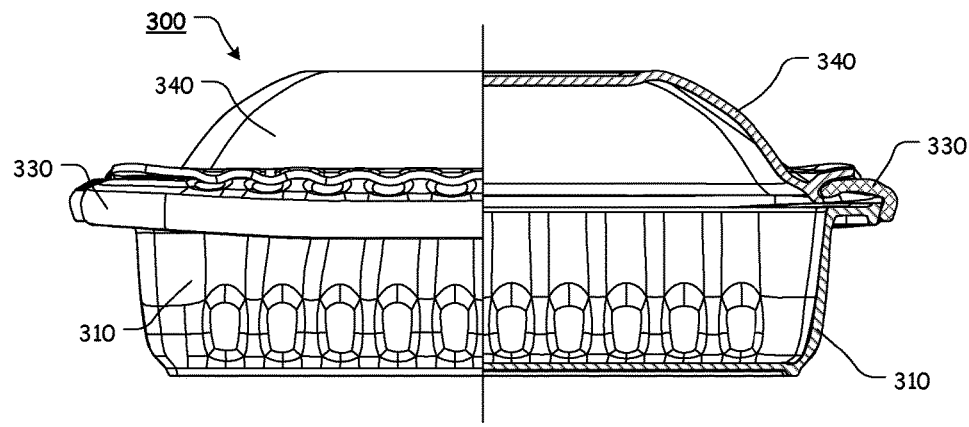
FIG. 18 illustrates a partial front cutaway view of the assembled combination of the cover element, the ring element, and the bottom element of the third exemplary embodiment of a serving container system, according to this invention.
Figure 19:
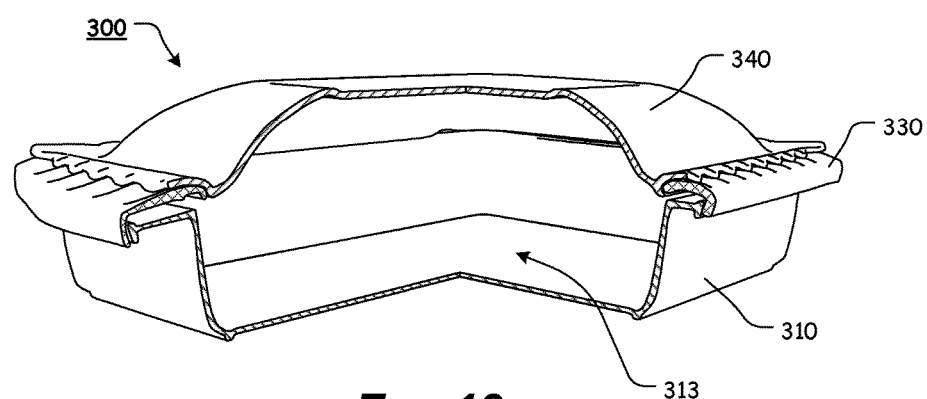
FIG. 19 illustrates a partial isometric cutaway view of the assembled combination of the cover element, the ring element, and the bottom element of the third exemplary embodiment of a serving container system, according to this
Figure 20:
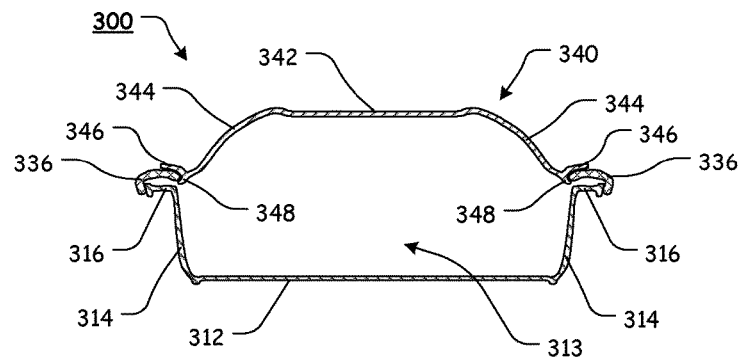
FIG. 20 shows a front cross-sectional view taken along line 20-20 of FIG. 17, illustrating the third exemplary embodiment of a serving container system of this invention in greater detail.
Figure 21:
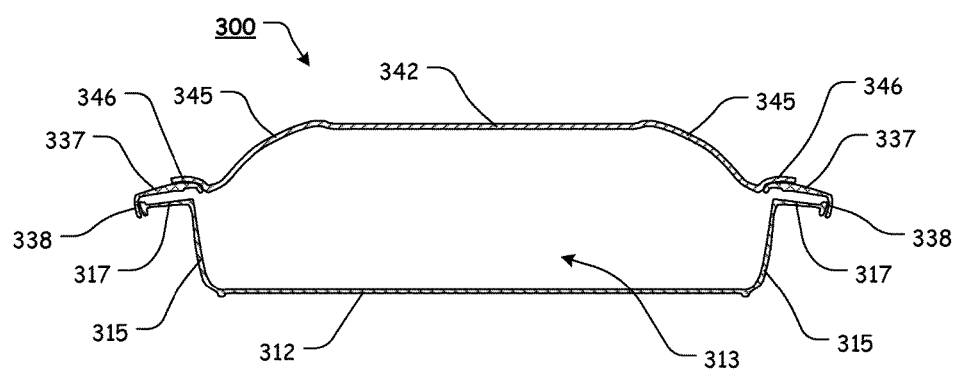
FIG. 21 shows a right side cross-sectional view taken along line 20-20 of FIG. 17, illustrating the third exemplary embodiment of a serving container system of this invention in greater detail.

FIG. 10 is a side view of an exemplary embodiment of an alternative embodiment of a ring element 230, according to this invention. As illustrated in FIG. 10, the ring element 230 comprises at least some of a ring element lip 236, a ring element lip extension 236' (not shown), ring element handle portions 237, handle skirt portions 238, and at least one recess 239.

It should be understood that each of these elements corresponds to and operates similarly to the ring element 130, the ring element lip 136, the ring element lip extension 136, the ring element handle portions 137, the handle skirt portions 138, and the at least one recess 139, as described above with reference to the serving container system 100 of FIG. 1.

However, as illustrated in FIG. 10, the recesses 239 are formed to comprise apertures that extend through the ring element lips 236 and the ring element handle portions 237.

FIGS. 11-21 illustrate certain elements and/or aspects of a third exemplary embodiment of the serving container system 300, according to this invention. In illustrative, non-limiting embodiment(s) of this invention, as illustrated in FIGS. 11-21, the serving container system 300 comprise at least some of a serving dish 310, a hollow or substantially hollow ring element 330, and optionally a cover 340.

The serving dish 310 includes a bottom wall 312. A pair of opposing, upwardly extending side walls 314 and a pair of opposing, upwardly extending end walls 315 extend from an outer periphery of the bottom wall 312. The extending side walls 314 and the extending end walls 315 meet and are continuous at four corners. A continuous serving dish lip 316 extends outwardly from an upper edge of the upwardly extending side walls 314 and the upwardly extending end walls 315.

A cavity 313 is defined within the area formed by the bottom wall 312, the extending side walls 314, and the extending end walls 315. The cavity 313 may also include the area within the serving dish lip 316 and be defined within the area formed by the bottom wall 312, the extending side walls 314, the extending end walls 315, and the serving dish lip 316.

Typically, two serving dish handles 317 extend outwardly from the continuous serving dish lip 316 on opposing sides of the serving dish 310. The size, shape, and placement of the serving dish handles 317 is a design choice based upon the desired appearance and/or functionality of the serving dish 310.

The foil pan 320 includes a bottom wall 322. A pair of opposing, upwardly extending side walls 324 and a pair of opposing, upwardly extending end walls 325 extend from around an outer periphery of the bottom wall 322. The extending side walls 324 and the extending end walls 325 meet and are continuous at four corners. A continuous foil pan lip 326 extends outwardly from an upper edge of the upwardly extending side walls 324 and the upwardly extending end walls 325.

A cavity 323 is defined within the area formed by the bottom wall 322, the extending side walls 324, and the extending end walls 325. The cavity 323 may also include the area within the foil pan lip 326 and be defined within the area formed by the bottom wall 322, the extending side walls 324, the extending end walls 325, and the foil pan lip 326.

While the foil pan 320 is illustrated as being included in the serving container system 300, it should be understood that the foil pan 320 is an exemplary foil pan that can be utilized with the serving container system 300 and is not a necessary component of the serving container system 300. Therefore, the foil pan 320 may or may not be included as an element of the serving container system 300. Notwithstanding the foregoing, the foil pan 320 has a size and shape that substantially corresponds to the size and shape of the serving dish 310. In this manner, the foil pan 320 can be substantially nested within the serving dish 310.

If nested within the cavity 313 of the serving dish 310, the foil pan lip 326 typically rests atop the serving dish lip 316 so as to be secured between the serving dish lip 316 and the ring element lip 336. However, it should be appreciated that, in various exemplary embodiments, the foil pan lip 326 may fit within the cavity 313 of the serving dish 310, when the foil pan 320 is nested within the serving dish 310.

The ring element 330 includes a continuous or substantially continuous ring element lip 336 having a shape that substantially corresponds to the shape of the serving dish lip 316. Portions of the ring element lip 336 are formed to be positionable around at least a portion of the serving dish lip 316 and provide frictional engagement of portions of the ring element lip 336 with at least a portion of the serving dish lip 316.

At least two ring element handle portions 337 extend outwardly from the ring element lip 336. It should be appreciated that the number of ring element handle portions 337 is dictated by the number of usable serving dish handle portions 317. Each ring element handle portion 337 has a shape that substantially corresponds to the shape of the serving dish handles 317 and includes a handle skirt portion 338 that extends downwardly from the handle portion 337.

Each handle skirt portion 338 is formed to be positionable around at least a portion of a serving dish handle 317 and provide frictional engagement of the handle skirt portion 338 with at least a portion of the serving dish handle 317. In various exemplary embodiments, the handle skirt portions 338 extend outwardly from the handle portions 337, below a longitudinal plane formed by a bottom portion of the ring element lip 336.

In certain exemplary embodiments, the ring element lip 336 further includes a ring element lip extension 336' that extends downwardly from the ring element lip 336, below the longitudinal plane formed by the bottom portion of the ring element lip 336. In this manner, when the ring element 330 is placed atop the serving dish 310, the ring element lip extension 336' may extend into the cavity 313 of the serving dish 310 or may extend outside of the serving dish lip 316.

In certain exemplary embodiments, the serving dish 310 includes a bottom wall 312, a continuous, upwardly extending side wall 314, wherein said upwardly extending side wall 314 extends upwardly from around an outer periphery of said bottom wall 312, wherein a continuous serving dish lip 316 extends outwardly from an upper edge of said upwardly extending side wall 314. In these embodiments, the ring element 330 includes a ring element lip 336 having a shape that substantially corresponds to said shape of said serving dish lip 316, wherein portions of the ring element lip 336 are formed to be positionable around at least a portion of said serving dish lip 316 to provide frictional engagement between portions of said ring element lip 336 and at least a portion of said serving dish lip 316.

The ring element 330 includes a continuous or substantially continuous ring element lip 336 having a shape that substantially corresponds to the shape of the serving dish lip 316. Portions of the ring element lip 336 are formed to be positionable around at least a portion of the serving dish lip 316 and provide frictional engagement of portions of the ring element lip 336 with at least a portion of the serving dish lip 316.

The cover element 340 includes a top wall 342. A pair of opposing, downwardly extending side walls 344 and a pair of opposing, downwardly extending end walls 345 extend from around an outer periphery of the top wall 342. The extending side walls 344 and the extending end walls 345 meet and are continuous at four corners. A continuous cover element lip 346 extends outwardly from a lower edge of the downwardly extending side walls 344 and the downwardly extending end walls 345.

The cover element 340 further includes one or more cover engagement tabs 348 extending from portions of the cover element lip 346 to provide frictional engagement of the cover element 430 with at least a portion of the ring element lip 336 and/or ring element lip extension 336'. In various exemplary embodiments, the cover engagement tabs 348 only extend from portions of the side walls 344 and not from the end walls 345.

A cavity is defined within the area formed by the top wall 342, the extending side walls 344, and the extending end walls 345. The cavity 343 may also include the area within the cover element lip 346 and be defined within the area formed by the top wall 342, the extending side walls 344, the extending end walls 345, and the cover element lip 346.

In various exemplary embodiments, various components of the serving container system 300 (i.e., the serving dish 310 and the cover 340) may be substantially rigid and formed of a ceramic or other similar material. Certain other components, (i.e., the ring element 330) may be at least somewhat flexible and formed of a rubber, silicone, or other similar material.

Alternate materials of construction of the various components of the serving container system 300 may include one or more of the following: wood, steel, stainless steel, aluminum, titanium, and/or other metals, as well as various alloys and composites thereof, glass-hardened polymers, polymeric composites, polymer or fiber reinforced metals, carbon fiber or glass fiber composites, continuous fibers in combination with thermoset and thermoplastic resins, chopped glass or carbon fibers used for injection molding compounds, laminate glass or carbon fiber, epoxy laminates, woven glass fiber laminates, impregnate fibers, polyester resins, epoxy resins, phenolic resins, polyimide resins, cyanate resins, high-strength plastics, nylon, glass, or polymer fiber reinforced plastics, thermoform and/or thermoset materials, and/or various combinations of the foregoing. Thus, it should be understood that the material or materials used to form the various components of the serving container system 300 is a design choice based on the desired appearance and functionality of the serving container system 300.

It should be appreciated that certain elements of the serving container system 300 may be formed as an integral unit (such as, for example, the bottom wall 312, the extending side walls 314, the extending end walls 315, the serving dish lip 316, and the handles 317). Alternatively, suitable materials can be used and sections or elements made independently and attached or coupled together, such as by adhesives, welding, screws, rivets, pins, or other fasteners, to form the various elements of the serving container system 300.

It should also be understood that the overall size and shape of the elements of the serving container system 300, and the various portions thereof, is a design choice based upon the desired functionality and/or appearance of the serving container system 300.

It should also be appreciated that the serving dish handles 317 and the ring element handle portions 337 are optional and may not be included as elements of the serving dish 310 or the ring element 330, respectively.

When in use, a foil pan, such as, for example, exemplary foil pan 320 is nested within the cavity 313 of the serving dish 310. The ring element 330 is then aligned so that each ring element handle portion 337 is aligned atop a corresponding serving dish handle 317. As a downward force is applied to the ring element handle portions 337 and/or portions of the ring element lip 336, the handle skirt portions 338 are urged and frictionally fitted around at least a portion of the serving dish handles 317 and portions of the ring element lip 336 are urged and frictionally fitted around at least a portion of the serving dish lip 316.

When the handle skirt portions 338 are in frictional engagement with at least a portion of each of the serving dish handles 317 and appropriate portions of the ring element lip 336 are in frictional engagement with appropriate portions of the serving dish lip 316, the ring element 330 is removably secured to the serving dish 310 and the ring element 330 secures the foil pan 320 within the serving dish 310.

If desired, the optional cover 340 can be releasably attached atop the ring element 330. To releasably attach the optional cover 340 to the ring element 330, the one or more cover engagement tabs 348 are urged downward, past at least a portion of the ring element lip 336 and/or ring element lip extension 336' such that portions of the cover element lip 346 and cover engagement tabs 348 frictionally engage the interior of the ring element lip 336.

While this invention has been described in conjunction with the exemplary embodiments outlined above, the foregoing description of exemplary embodiments of the invention, as set forth above, are intended to be illustrative, not limiting and the fundamental invention should not be considered to be necessarily so constrained. It is evident that the invention is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the invention. The upper and lower limits of these smaller ranges may independently be included in the smaller ranges and is also encompassed within the invention, subject to any specifically excluded limit in the stated range. Where the stated range includes one or both of the limits, ranges excluding either or both of those included limits are also included in the invention.

It is to be understood that the phraseology of terminology employed herein is for the purpose of description and not of limitation. Unless defined otherwise, all technical and scientific terms used herein have the same meaning as commonly understood by one of ordinary skill in the art to which this invention belongs.

In addition, it is contemplated that any optional feature of the inventive variations described herein may be set forth and claimed independently, or in combination with any one or more of the features described herein.

Accordingly, the foregoing description of exemplary embodiments will reveal the general nature of the invention, such that others may, by applying current knowledge, change, vary, modify, and/or adapt these exemplary, non-limiting embodiments for various applications without departing from the spirit and scope of the invention and elements or methods similar or equivalent to those described herein can be used in practicing the present invention. Any and all such changes, variations, modifications, and/or adaptations should and are intended to be comprehended within the meaning and range of equivalents of the disclosed exemplary embodiments and may be substituted without departing from the true spirit and scope of the invention.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. A serving container and ring element system, comprising:
   a serving dish, wherein said serving dish includes one or more upwardly extending walls, wherein at least a portion of a serving dish lip extends outwardly from an upper edge of said one or more upwardly extending walls, and wherein at least two serving dish handles extend outwardly from said continuous serving dish lip on opposing sides of said serving dish; and
   a ring element, wherein said ring element includes a ring element lip having a shape that substantially corresponds to said shape of said serving dish lip, wherein portions of said ring element lip are formed to be positionable around at least a portion of said serving dish lip to provide at least partial frictional engagement between portions of said ring element lip and at least a portion of said serving dish lip, wherein at least two ring element handle portions extend outwardly from said ring element lip, wherein each ring element handle portion has a shape that substantially corresponds to said shape of said serving dish handles, wherein each ring element handle portion includes a handle skirt portion extending downwardly from said handle portion, wherein each handle skirt portion is formed so as to be positionable around at least a portion of a serving dish handle and provide at least partial frictional engagement of said handle skirt portion with at least a portion of said serving dish handle, and wherein when said handle skirt portions are in frictional engagement with at least a portion of each of said serving dish handles, at least a portion of said ring element is secured around and over at least a portion of said serving dish lip, but wherein said ring element does not entirely cover said serving dish.

2. The serving container and ring element system of claim 1, further comprising a cover element, wherein said cover element includes a top wall, one or more downwardly extending walls, wherein said one or more downwardly extending walls extend downwardly from around an outer periphery of said top wall, wherein a continuous cover element lip extends outwardly from a lower edge of said one or more downwardly extending walls, and wherein one or more cover engagement tabs extend from portions of said cover element lip to provide at least partial frictional engagement between said one or more cover engagement tabs and at least a portion of said ring element lip.

3. The serving container and ring element system of claim 2, wherein said ring element lip further comprises one or more ring element lip extensions that extend downwardly from said ring element lip and wherein said cover engagement tabs extend from portions of said cover element lip to provide at least partial frictional engagement between said one or more cover engagement tabs and at least a portion of said ring element lip and said ring element lip extensions.

4. The serving container and ring element system of claim 2, wherein said cover engagement tabs only extend from portions of said one or more downwardly extending walls of said cover.

5. The serving container and ring element system of claim 1, further comprising a foil pan having a shape that substantially corresponds to said shape of said serving dish, such that said foil pan can be substantially nested within said serving dish, such that said ring element secures said foil pan between said ring element and said serving dish.

6. The serving container and ring element system of claim 5, wherein said foil pan comprises a bottom wall, one or more upwardly extending walls, wherein said one or more upwardly extending walls extend upwardly from around an outer periphery of said bottom wall, and wherein a continuous foil pan lip extends outwardly from an upper edge of said one or more upwardly extending walls.

7. The serving container and ring element system of claim 1, wherein said handle skirt portions extend downwardly from said handle portions, below said ring element lip.

8. A serving container and ring element system, comprising:
   a serving dish, wherein said serving dish includes a bottom wall, one or more upwardly extending walls, wherein a continuous serving dish lip extends outwardly from an upper edge of said one or more upwardly extending walls, and wherein at least two serving dish handles extend outwardly from said continuous serving dish lip on opposing sides of said serving dish;
   a ring element, wherein said ring element includes a ring element lip having a shape that substantially corresponds to said shape of said serving dish lip, wherein portions of said ring element lip are formed to be positionable around at least a portion of said serving dish lip to provide at least partial frictional engagement between portions of said ring element lip and at least a portion of said serving dish lip, wherein at least two ring element handle portions extend outwardly from said ring element lip, wherein each ring element handle portion has a shape that substantially corresponds to said shape of said serving dish handles, wherein each ring element handle portion includes a handle skirt portion extending downwardly from said handle portion, wherein each handle skirt portion is formed so as to be positionable around at least a portion of a serving dish handle and provide at least partial frictional engagement of said handle skirt portion with at least a portion of said serving dish handle, and wherein when said handle skirt portions are in frictional engagement with at least a portion of each of said serving dish handles, at least a portion of said ring element is secured around and over at least a portion of said serving dish lip, but wherein said ring element does not entirely cover said serving dish; and a cover element, wherein said cover element includes a top wall, one or more downwardly extending walls, wherein said one or more downwardly extending walls extend downwardly from around an outer periphery of said top wall, wherein a cover element lip extends outwardly from a lower edge of said one or more downwardly extending walls, wherein one or more cover engagement tabs extend from portions of said cover element lip to provide at least partial frictional engagement between said one or more cover engagement tabs and at least a portion of said ring element lip, and wherein at least two cover element handles extend outwardly from said continuous cover element lip on opposing sides of said cover element.

9. The serving container and ring element system of claim 8, wherein said ring element lip further comprises one or more ring element lip extensions that extend downwardly from said ring element lip and wherein said cover engagement tabs extend from portions of said cover element lip to provide at least partial frictional engagement between said one or more cover engagement tabs and at least a portion of said ring element lip and said ring element lip extensions.

10. The serving container and ring element system of claim 8, wherein said cover engagement tabs only extend from portions of said one or more downwardly extending walls of said cover.

11. The serving container and ring element system of claim 8, further comprising a foil pan having a shape that substantially corresponds to said shape of said serving dish, such that said foil pan can be substantially nested within said serving dish, such that said ring element secures said foil pan between said ring element and said serving dish.

12. The serving container and ring element system of claim 11, wherein said foil pan comprises a bottom wall, one or more upwardly extending walls, wherein said one or more upwardly extending walls extend upwardly from around an outer periphery of said bottom wall, and wherein a continuous foil pan lip extends outwardly from an upper edge of said one or more upwardly extending walls.

13. The serving container and ring element system of claim 8, wherein said handle skirt portions extend downwardly from said handle portions, below said ring element lip.

14. A serving container and ring element system, comprising:

a serving dish, wherein said serving dish includes a continuous, upwardly extending wall, wherein a serving dish lip extends outwardly from an upper edge of at least a portion of said upwardly extending wall; and a ring element, wherein said ring element includes a ring element lip having a shape that substantially corresponds to at least said shape of said serving dish lip, wherein portions of said ring element lip are formed to be positionable atop at least a portion of said serving dish lip to cover at least a portion of said serving dish lip, such that when said portions of said ring element lip are atop at least a portion of said serving dish lip, at least a portion of said ring element is over at least a portion of said serving dish lip, but wherein said ring element does not entirely cover said serving dish.

15. The serving container and ring element system of claim 14, wherein portions of said ring element lip are formed to be positionable around at least a portion of said serving dish lip to provide at least partial frictional engagement between portions of said ring element lip and at least a portion of said serving dish lip, such that when said portions of said ring element lip are in frictional engagement with at least a portion of said serving dish lip, at least a portion of said ring element is secured around and over at least a portion of said serving dish lip, but wherein said ring element does not entirely cover said serving dish.

16. The serving container and ring element system of claim 14, wherein at least two serving dish handles extend outwardly from said continuous serving dish lip on opposing sides of said serving dish.

17. The serving container and ring element system of claim 14, further comprising a cover element, wherein said cover element includes a top wall, a continuous, downwardly extending wall, wherein said downwardly extending wall extends downwardly from around an outer periphery of said top wall, wherein a cover element lip extends outwardly from at least a portion of a lower edge of said downwardly extending wall, wherein one or more cover engagement tabs extend from portions of said cover element lip to provide at least partial frictional engagement between said one or more cover engagement tabs and at least a portion of said ring element lip.

18. The serving container and ring element system of claim 17, wherein at least two cover element handles extend outwardly from said cover element lip on opposing sides of said cover element.

19. The serving container and ring element system of claim 18, wherein at least two ring element handle portions extend outwardly from said ring element lip, wherein each ring element handle portion has a shape that substantially corresponds to said shape of said serving dish handles, wherein each ring element handle portion includes a handle skirt portion extending downwardly from said handle portion, wherein each handle skirt portion is formed so as to be positionable around at least a portion of a serving dish handle and provide at least partial frictional engagement of said handle skirt portion with at least a portion of said serving dish handle, and wherein when said handle skirt portions are in frictional engagement with at least a portion of each of said serving dish handles.

20. The serving container and ring element system of claim 14, further comprising a foil pan having a shape that substantially corresponds to said shape of said serving dish, such that said foil pan can be substantially nested within said serving dish, such that said ring element secures said foil pan between said ring element and said serving dish.

* * * * *